United States Patent [19]

Block et al.

[11] Patent Number: 5,137,959
[45] Date of Patent: Aug. 11, 1992

[54] THERMALLY CONDUCTIVE ELASTOMER CONTAINING ALUMINA PLATELETS

[75] Inventors: Jacob Block, Rockville; John W.-K. Lau, Gaithersburg, both of Md.

[73] Assignee: W. R. Grace & Co.-Conn., New York, N.Y.

[21] Appl. No.: 705,483

[22] Filed: May 24, 1991

[51] Int. Cl.$^5$ .......................... C08J 5/10; C08K 3/18; C08K 3/22; C08L 9/06
[52] U.S. Cl. ..................................................... 524/430
[58] Field of Search ......................................... 524/430

[56] References Cited

U.S. PATENT DOCUMENTS 5,008,307 4/1991 Inomata ............................... 524/786

Primary Examiner—Paul R. Michl
Assistant Examiner—U. K. Rajguru
Attorney, Agent, or Firm—Steven Capella

[57] ABSTRACT

Alpha alumina platelets are used as thermally conductive, electrically insulating filler in thermally conductive, electrically insulating elastomers. The platelets provide improved thermal conductivity in comparison to conventional alumina fillers. The platelets preferably average less than one micron thickness with an average aspect ratio of at least about 5:1.

12 Claims, No Drawings

THERMALLY CONDUCTIVE ELASTOMER CONTAINING ALUMINA PLATELETS

BACKGROUND OF THE INVENTION

Thermally conductive elastomers are elastomeric materials which contain a thermally conductive filler. They are primarily used in electronics applications in instances where good thermal conduction and electrical insulation are needed in the same material. For example, a thermally conductive elastomer may be used as an interface between a semiconductor electronic component and a metal heat sink.

Many electronics designs and applications are linked by the ability to dissipate ohmic heat generated during the operation of the electronics. Many electronic components, especially semiconductor components, are prone to breakdown at high temperatures. Thus, the ability to dissipate heat is a limiting factor on the performance of the component.

High thermal conductivity metal heat sinks, because of their high electrical conductivity, cannot be directly contacted with electronic components. Therefore, thermally conductive elastomer material is used as a thermally conductive, electrically insulating interface between the electronic component and the metal heat sink. The thermal conductivity of thermally conductive elastomer is generally much less than that of the metal heat sink. Thus, the thermal conductivity of the thermally conductive elastomer limits the overall ability to dissipate ohmic heat.

Typical thermally conductive elastomers contain a ceramic filler such as boron nitride or alumina in an elastomer matrix. The alumina is generally in the form of irregularly shaped α-alumina particles. The elastomers used are usually urethane or silicone based. While these materials are adequate in many instances, there is a constant demand for thermally conductive elastomers with improved thermal conductivity and electrical insulating properties.

SUMMARY OF THE INVENTION

The invention provides filled thermally conductive electrically insulating elastomers of improved thermal conductivity using alumina platelets as the filler.

In one aspect, the invention encompasses a thermally conductive electrically insulating filled elastomer composition comprising an elastomer and filler, the filler comprising alpha alumina platelets.

The platelets preferably average less than one micron in thickness and preferably have an average aspect ratio of at least about 5:1. Preferably the elastomer composition contains at least about 70 wt% alumina platelets.

DETAILED DESCRIPTION OF THE INVENTION

The compositions of the invention generally comprise an elastomer and alpha alumina platelets as a thermally conductive filler.

The elastomer may be any known compatible elastomer such as silicones, styrene-containing block copolymers, olefin-containing block copolymers, and the like. The elastomer may be a crosslinkable block copolymer if desired.

Silicone elastomers are preferably formed from a silicone gum which is crosslinked using a catalyst. An example of a suitable silicone gum is sold under the name "Silastic® 4-2765" by Dow Corning, Inc. A peroxide catalyst: 2,5-dimethyl 2,5-bis (t-butyl peroxy) hexane 50% on CaCO$_3$ sold by R. T. Vanderbilt as Varox® DBPH-50 is an example of a suitable catalyst.

Preferred block copolymers are thermoplastic rubbers such as Kraton® G-1657-MX (a styrene-ethylene-butylene-styrene block copolymer having a styrene/rubber ratio of 13/87) sold by Shell Chemical Co.

Preferred crosslinkable block copolymers are thermoplastic rubbers such as Kraton® G-1901-X and Kraton® RP-6501 sold by Shell Chemical Co. These rubbers are styrene/olefin based with functional groups. G-1901-X has carboxyl groups whereas RP-6501 has ethoxysilanol groups. In order to cause crosslinking, a crosslinking agent and a crosslinking catalyst are preferably combined with the crosslinkable copolymer. A preferred crosslinking agent is Cymel® 303 (hexamethoxymethylmelamine) sold by American Cyanamid. A preferred crosslinking catalyst for G-1901-X is Cycat® 600 (aromatic sulfonic acid) also sold by American Cyanamid. For RP-6501, dibutyl tin dilaurate is a preferred catalyst.

The thermally conductive filler comprises alpha alumina platelets. Other thermally conductive fillers may be used in conjunction with the alumina platelets, however, compositions having alumina platelets as the only thermally conductive filler are preferred. The platelets preferably have an average diameter of about 2-50 microns (smaller diameters in this range are more preferred) and an average thickness of less than one micron. The platelets also preferably have an average aspect ratio (diameter : thickness) of at least about 5:1. The platelets may be obtained commercially or may be formed by any known process.

The proportion of alumina platelets in the filled composition may vary depending on factors such as the desired thermal conductivity, the degree of elasticity desired, etc. Generally, the thermal conductivity increases with the proportion of platelets in the composition. Preferably the composition contains at least about 60 wt.% platelets, more preferably at least about 70 wt.%. The balance of the composition is formed by the elastomer and any auxiliary materials (e.g. catalysts, residual solvents, plasticizers, other fillers, etc.) Any appropriate conventional additives may be incorporated into the composition.

The filled elastomer compositions preferably have a thermal conductivity of at least about $2.5 \times 10^{-3}$ cal/sec-cm-K, more preferably at least about $3.0 \times 10^{-3}$ cal/sec-cm-K. The thermal conductivity will vary with the type of elastomer used. Silicone elastomers generally provide higher thermal conductivity (e.g. at least about $3.9 \times 10^{-3}$ cal/sec-cm-K).

The filled elastomers may be formed by any conventional method in any conventional shape. Preferred methods include those disclosed in copending applications Ser. No. 07/705,275 and 07/705,482 which are incorporated herein by reference. The methods all involve the formation of an initial mixture containing the elastomer and the filler. The initial mixture (depending on its consistency) may then be cast into a sheet, dried and then heated and pressed. Alternatively, the initial mixture may be dried and then molded in a die using heat and pressure. The drying step may be eliminated if the initial mixture does not contain a solvent.

The invention is further illustrated by the following examples. The invention is not limited to the materials, process steps or results given in the examples below.

EXAMPLE 1

This example illustrates the preparation of the α-alumina platelets.

Gamma alumina (98 g of Versal ® GH obtained from LaRoche Chemicals) was mixed with aluminum fluoride (2g) and placed in a covered crucible. The crucible was placed in a furnace and heated at 5° C./min to 1200° C. The sample was held at 1200° C. for 30 min., and then cooled to room temperature. The product produced was α-alumina platelets (2-3 microns in diameter).

EXAMPLE 2

This example illustrates the preparation of a composite of alumina platelets and an elastomer.

Kraton ® 1657-MX thermoplastic rubber (10g) was dissolved in toluene (40 g). The alumina platelets described in Example 1 (23.3 g) were added to the above solution, and this was followed by the addition of 5.0 g of iso-propyl alcohol. Air was removed from the mixture by placing the mixture under vacuum for several minutes. The mixture was then cast on a Teflon ® sheet and smoothed with a doctor blade set at 100 mils. The cast sheet was air-dried for 1 hour and then oven dried at 70° C. overnight to remove solvents. After drying, the resultant sheet was pressed together with another similar sheet at 20,000 pounds of force at 163° C. for 5 minutes.

The thermal conductivity of the resultant sheet was determined and was found to be $3.2 \times 10^{-3}$ cal/sec-cm-K.

EXAMPLE 3

This example is a comparative example showing that a non-platelet alumina does not give the same thermal conductivity as the platelet alumina.

The experiment described in Example 2 was repeated with the exception that Alcoa tabular alumina was substituted for the alumina platelets. The thermal conductivity of this product was found to be only $2.1 \times 10^{-3}$ cal/sec-cm-K, compared to $3.2 \times 10^{-3}$ cal/sec-cm-K of the platelet of Example 2.

EXAMPLE 4

This example shows that a crosslinkable Kraton ® type elastomer containing COOH groups can be used as the elastomer.

The experiment described in Example 2 was repeated with the exception that Kraton ® 1901-X was substituted for Kraton ® 1657-MX. Cymel ® 303 and Cycat ® 600 were added for crosslinking at the 2.5% and 0.25% level respectively based on the amount of rubber. The thermal conductivity of this composite was found to be $3.1 \times 10^{-3}$ cal/sec-cm-K.

EXAMPLE 5

This example shows that the α-$Al_2O_3$ platelets can be used in a silicone rubber.

The experiment described in Example 4 was repeated with the exception that a silicone gum (Silastic 4-2765 manufactured by Dow Corning, Inc.) was substituted for the Kraton ® rubber. Varox ® 130 (2,5-Dimethyl-2,5-di(t-butylperoxy)-3-hexyne) (4.0% silicone gum basis) was used as the crosslinker. The resulting product had a thermal conductivity of $3.9 \times 10^{-3}$ cal/sec-cm-K, which is even higher than the value obtained in Example 4.

EXAMPLE 6

This example illustrates the preparation of larger α-alumina platelets.

The experiment described in Example 1 was repeated with the exception that Aluminum Oxide C (obtained from De Gussa Corp.) was used instead of the Versal ® GH. The platelets produced were similar to those of example 1 with the exception that they were much larger (40-50 microns in diameter).

EXAMPLE 7

This example shows that the large platelets of Example 6 can also be used to obtain higher thermal conductivities.

The experiment described in Example 2 was repeated with the exception that the large platelets of Example 6 were used instead of the smaller platelets of Example 1. The thermal conductivity of the resultant product was $2.9 \times 10^{-3}$ cal/sec-cm-K.

EXAMPLE 8

This example shows that commercial α-alumina platelets can also be used in the invention.

The experiment described in Example 2 was repeated with the exception that α-alumina platelets obtained from Ato-Chem Corporation were substituted for the platelets used in Example 2. The resulting product had a thermal conductivity of $2.9 \times 10^{-3}$ cal/sec-cm-K.

What is claimed is:

1. A thermally conductive filled elastomer composition consisting essentially of an elastomer and filler, said filler consisting essentially of alpha alumina platelets having an average ratio of diameter to thickness of at least about 5:1.

2. The composition of claim 1 wherein said platelets have an average thickness of less than one micron.

3. The composition of claim 2 wherein said platelets have an average diameter of about 2-50 microns.

4. The composition of claim 1 containing at least about 70 wt.% alumina platelets.

5. The composition of claim 1 wherein said elastomer includes silicone rubber.

6. The composition of claim 1 wherein said elastomer includes block copolymer.

7. The composition of claim 6 wherein said copolymer contains olefin.

8. The composition of claim 5 wherein said copolymer contains styrene.

9. The composition of claim 1 wherein said elastomer is crosslinked.

10. The composition of claim 1 having a thermal conductivity of at least about $2.5 \times 10^{-3}$ cal/sec-cm-K.

11. The composition of claim 1 wherein said composition is in the form of a sheet.

12. The composition of claim 10 having a thermal conductivity of at least about $3.0 \times 10^{-3}$ cal/sec-cm-K.

* * * * *